United States Patent [19]
Borcea et al.

[11] Patent Number: 5,163,729
[45] Date of Patent: Nov. 17, 1992

[54] PARALLEL GRIPPER ASSEMBLY

[76] Inventors: Nicky Borcea, 95 Steep Hill Rd., Weston; Alexandru D. Ionescu, 190 Sport Hill Rd., Easton, both of Conn. 06612

[21] Appl. No.: 748,441

[22] Filed: Aug. 22, 1991

[51] Int. Cl.⁵ .................................. B25J 15/08
[52] U.S. Cl. ........................ 294/119.1; 294/88; 901/37
[58] Field of Search ............ 294/119.1, 88, 81.54, 294/81.62, 67.33; 901/37, 39; 414/741, 751

[56] References Cited

U.S. PATENT DOCUMENTS

| | | | |
|---|---|---|---|
| 3,166,207 | 1/1965 | Quayle | 294/119.1 X |
| 3,655,232 | 4/1972 | Martelee | 294/119.1 X |
| 3,670,912 | 6/1972 | Dunbar | 294/119.1 X |
| 3,905,632 | 9/1975 | Caylor et al. | 294/119.1 |
| 4,252,358 | 2/1981 | Klebs | 294/67.33 |
| 4,865,375 | 9/1989 | Laub et al. | 901/37 X |
| 5,005,889 | 4/1991 | Nerger et al. | 294/119.1 X |
| 5,028,203 | 7/1991 | Masini | 294/119.1 X |

FOREIGN PATENT DOCUMENTS 312041 12/1988 Japan .................. 294/119.1

Primary Examiner—Margaret A. Focarino
Assistant Examiner—Joseph D. Pape
Attorney, Agent, or Firm—Arthur T. Fattibene; Paul A. Fattibene

[57] ABSTRACT

A parallel gripper assembly which includes a main body or housing having opposed mounting blocks and associated fingers slidably mounted thereon for movement between a protracted and retracted position. A pair of guide rods slidably support each of the mounting blocks and associated fingers for relative movement toward and away from the main housing with an independent piston and cylinder arrangement effecting the movement of each of the respective mounting blocks and associated fingers toward and away from one another. At least one of the guide rods supporting each of the respective mounting blocks is provided with a pinion rack which is disposed in meshing relationship with a pinion gear for effecting the synchronized movement of the mounting blocks and associated fingers when the piston and cylinder arrangement is actuated.

7 Claims, 3 Drawing Sheets

PARALLEL GRIPPER ASSEMBLY

FIELD OF THE INVENTION

This invention relates to parallel gripper assemblies, and more particularly to a parallel gripper assembly having synchronized movement with independent power and support means.

BACKGROUND OF THE INVENTION

Heretofore, various types of parallel grippers are known, e.g. such as disclosed in prior U.S. Pat. Nos. 4,593,948, and 4,509,783, commonly used on robotic type devices. Other types of parallel grippers are also known as disclosed in U.S. Pat. Nos. 1,736,363; 2,595,131; 2,668,465; 2,732,083; 3,188,077; 3,603,579; 3,670,912; 3,905,632; 4,529,183 and 4,707,013. Generally, the movable jaws of a gripper assembly are activated by a piston and cylinder assembly in which the piston rod of the piston and cylinder assembly functions as the means for slidably supporting the movable jaw as well as the driving force for the jaw. It has been noted that in such an arrangement, the piston forms a poor means for slidably supporting the jaw and reduces the power or force which such piston can otherwise exert upon the movable jaws. The operation of the piston and cylinder driven parallel grippers can be vastly improved by providing independent means for effecting the support function and the drive function of the jaws.

An object of this invention is to provide an improved parallel gripper assembly in which the support for the movable jaws is independent of the drive means.

Another object is to provide a parallel gripping assembly having a high gripping force to weight and size ratio.

Another object is to provide a parallel gripper assembly that can be utilized in any orientation without minimizing the gripping force.

Another object is to provide a parallel gripper that is rugged and accurate.

Another object is to provide a parallel gripper having relatively long independent supports having a minimal side play throughout the stroke thereof.

Another object is to provide a parallel gripper assembly in which the gripping force can be readily adjusted by varying the pressure of the actuating fluid.

SUMMARY OF THE INVENTION

The foregoing objects and other features of the invention are attained by a parallel gripper assembly which comprises a main body or housing for supporting thereon a pair of opposed mounting blocks which are slidably supported thereon by a pair of relatively long guide or support rods. The guide rods of the respective mounting blocks or jaws are oppositely disposed. Disposed within the housing are a pair of opposed cylinder chambers having a piston reciprocally mounted therein. The piston rod of the piston extends outwardly therefrom and connects to its respective mounting block or jaw whereby the movement of the respective mounting blocks is rendered responsive to the actuation of the associated piston. To effect synchronization of movement of the respective mounting blocks, at least one of the guide rods connected to each of the respective mounting blocks is provided with a pinion rack which is disposed in meshing relationship to a freely rotatable pinion gear. The arrangement is such that upon actuation of the respective piston and cylinders acting on its corresponding jaw or mounting block, the displacement of the mounting blocks in either direction of movement is synchronized.

A feature of this invention resides in the provision that each jaw or mounting block is actuated by an associated piston and cylinder assembly.

Another feature of this invention resides in the provision that each of the mounting blocks or jaws are slidably supported on the housing embodying the piston and cylinder assembly by a pair of relatively long guide rods.

Another feature resides in the provision of providing the mounting blocks with through bores for accommodating the extended ends of the guide rods of the other mounting block in the retracted position thereof.

Another feature resides in providing opposed guide rods connected to each of the movable jaws or mounting blocks with a rack portion or segment which is disposed in meshing relationship to a freely rotating pinion gear to synchronize the movement of the respective mounting blocks upon the actuation thereof.

Another feature resides in the provision of a parallel gripper assembly having a long support for the jaws and which is rugged and accurate.

Another feature resides in the provision of a parallel gripper assembly having in lined pistons to effect the actuation of the movable jaws or mounting blocks.

Another feature resides in a parallel gripper assembly in which the movable jaws have a minimum of side play.

Other features and advantages will become more readily apparent when considered in view of the drawings and detailed description thereof in which:

DETAILED DESCRIPTION OF A PREFERRED EMBODIMENT

Figure 1:
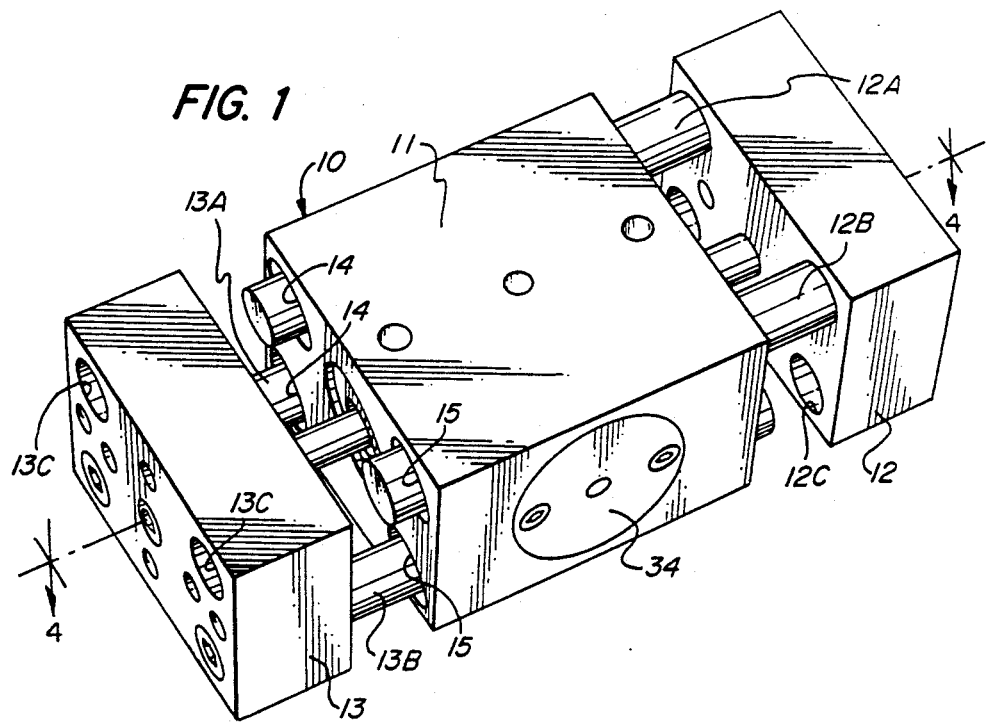
FIG. 1 is a perspective side view of a parallel gripper assembly embodying the invention shown without the gripping fingers.
Figure 2:
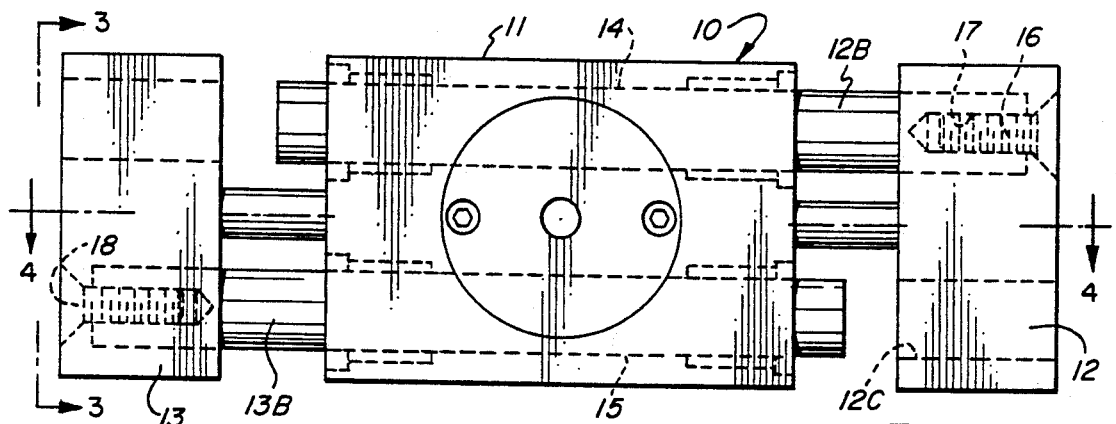
FIG. 2 is a bottom view of the gripper assembly of FIG. 1.
Figure 3:
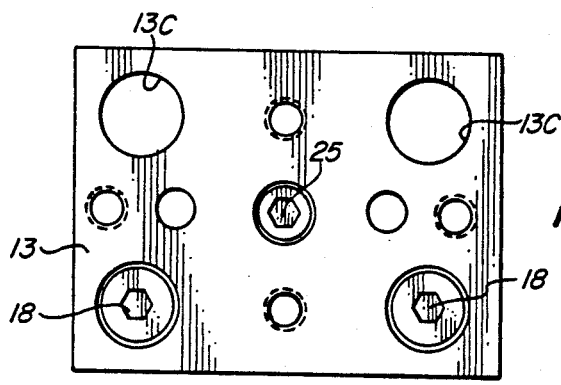
FIG. 3 is an end view taken along line 3—3 on FIG. 2.

Referring to the drawings, there is shown a parallel gripper assembly 10 embodying the present invention. As shown, the gripper assembly 10 includes a main body or housing 11 for supporting the movable jaws or mounting blocks 12 and 13. Each of the respective mounting blocks 12 and 13 are slidably supported in the main body or housing by a pair of relatively long support or guide rods. For example, guide rods 12A and 12B slidably support the mounting block 12 on the housing 11, and similar support or guide rods 13A and 13B support the opposite mounting block 13. It will be noted that guide rods 12A and 12B are oppositely disposed with respect to guide rods 13A and 13B respectively. With the arrangement described, the respective guide rods are relatively long and extend through appropriate bores 14—14 and 15—15 formed in the housing 11. As shown, the respective guide rods 12A and 12B are fixedly secured to its corresponding mounting block 12 by a screw or bolt 16 which is threaded in a tapped hole 17 formed on the end of the guide rods 12A and 12B. Guide rods 13A and 13B are similarly connected to their respective mounting block or jaw 13 by screw or bolt 18. The respective pairs of guide rods 12A, 12B and 13A, 13B thus slidably supports their respective mounting blocks 12 and 13 with a minimum of side play throughout the stroke thereof.

Figure 4:
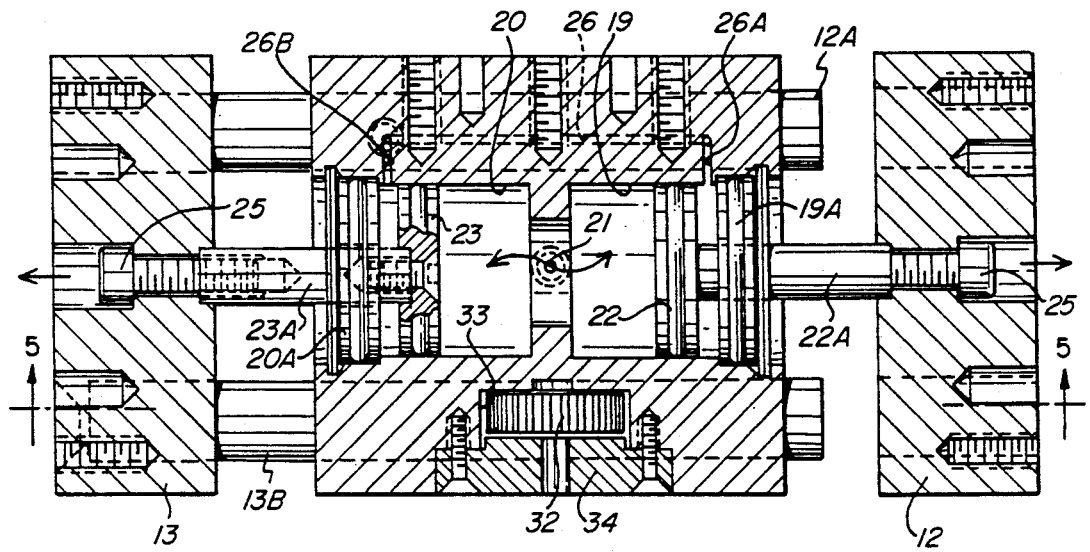
FIG. 4 is a sectional side view taken along line 4—4 on FIG. 1, with the mounting blocks illustrated in a protracted or extended position.
Figure 5:
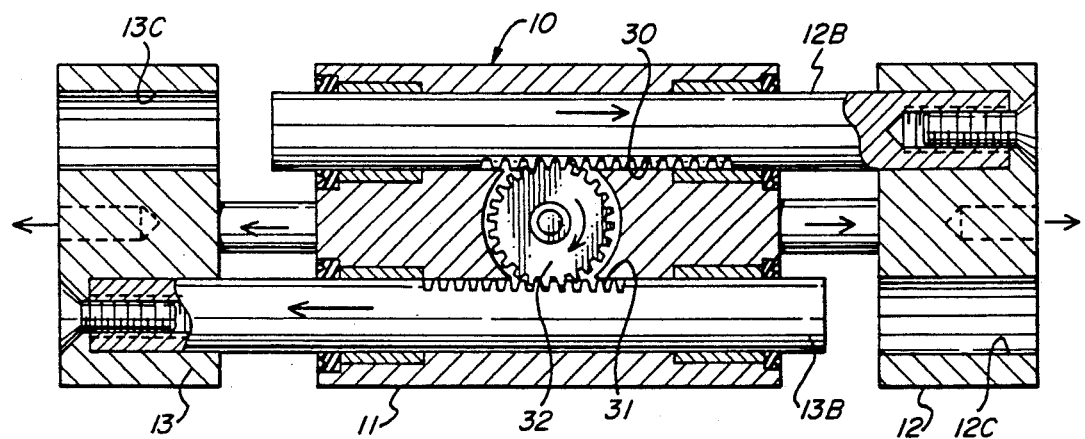
FIG. 5 is a sectional view taken along line 5—5 on FIG. 4.
Figure 6:
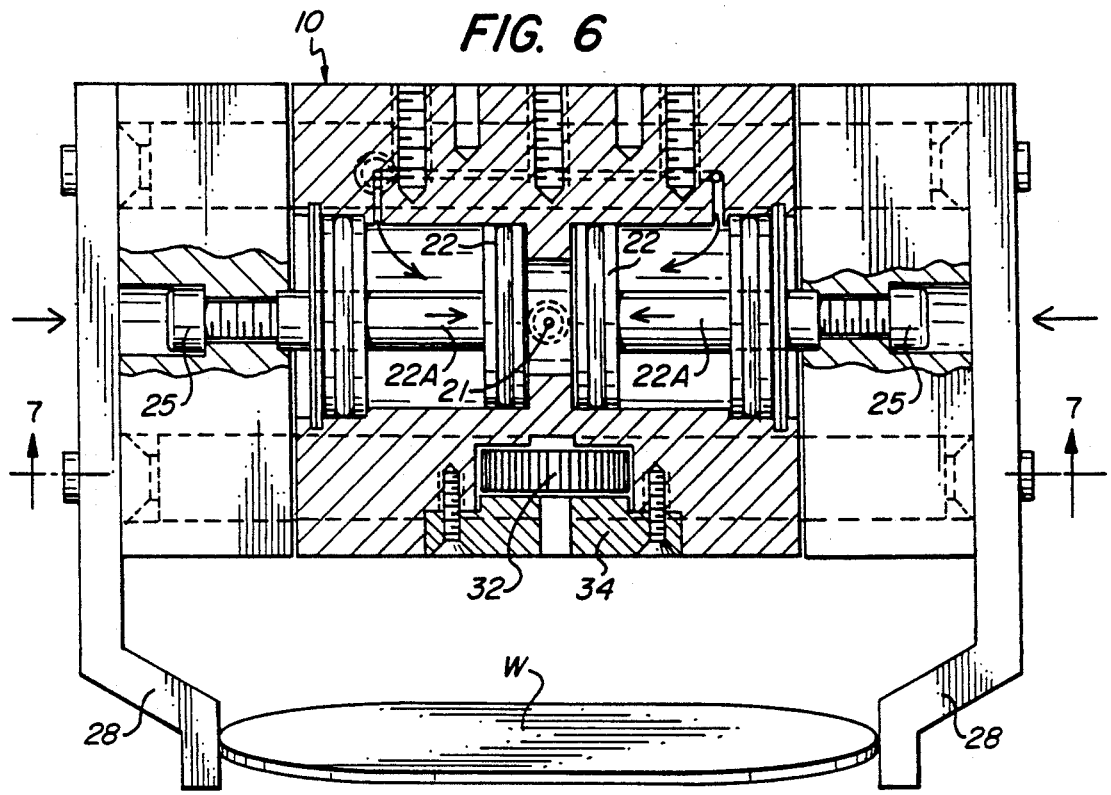
FIG. 6 is a sectional view similar to that of FIG. 4, but illustrating the parts in the retracted position with the gripping fingers attached.

Referring to FIGS. 4 and 6, the main body or housing 11 is formed with a pair of opposed cylinder chambers 19 and 20 disposed in axial alignment and in communication with a fluid port 21 for introducing and exhausting a fluid pressure to one side of a piston 22 and 23 reciprocally disposed in their respective chambers 19 and 20. An end wall or closure 19A and 20A seals the other end of chambers 19 and 20. Connected to each piston 22, 23 is a piston rod 22A and 23A respectively. The free ends of the respective piston rods 22A and 23A connect to its corresponding mounting block 12 and 13 by a bolt or screw 25. Fluid passageways 26 having branches 26A and 26B are provided for introducing and exhausting fluid pressure to the other side of the pistons 22 and 23. It will be understood that suitable controls, e.g. solenoid valves, may be utilized to control the flow of fluid pressure into and out of the respective chambers to activate the pistons 22 and 23 and associated mounting blocks. It will be understood that gripper fingers 28 are connected to each of the mounting blocks for picking up a workpiece W to complete the movable jaws.

Figure 7:
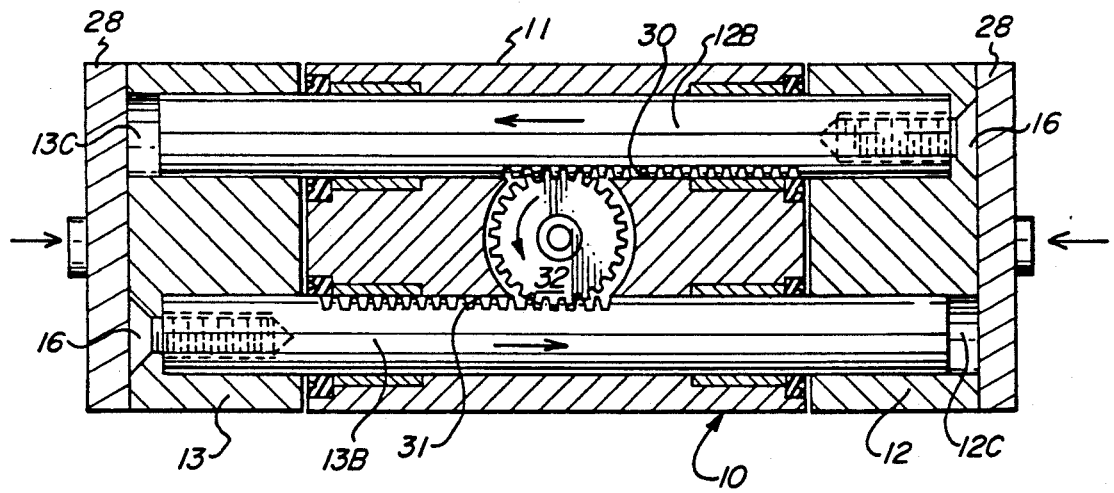
FIG. 7 is a sectional view taken along line 7—7 on FIG. 6.

To synchronize the actuation or movement of the respective mounting blocks between a protracted position as shown in FIG. 4 and a retracted position as shown in FIG. 6, each of the opposed guide rods 12B and 13B are provided with a rack portion or segment 30 and 31 respectively. Disposed in meshing relationship with pinion rack segments 30 and 31 is a pinion gear 32 which is freely rotatable within a gear chamber 33 formed within the housing 11. A cover plate 34 seals the pinion gear 32 within its chamber 33. As the respective guide rods 12A, 12B and 13A, 13B have a length which is greater than the length of the body each of the mounting blocks 12, 13 are provided with a pair of through bores 12C and 13C respectively for accommodating the free ends of the guide rods secured to the other mounting block in the retracted position thereof as best seen in FIGS. 6 and 7. Thus, openings 12C and 13C respectively in blocks 12 and 13 are slightly greater in diameter than the diameter of guide rods 12A, 12B and 13A, 13B respectively. It will be noted that the arrangement provides for a relatively large range of movement between the minimum and maximum openings of the jaws or mounting blocks 12 and 13.

In operation, when fluid is introduced into the respective chambers 19 and 20 through port 21, the fluid pressure acting on the heads of the pistons 22 and 23 will urge the pistons in opposite directions to effect the displacement of the mounting blocks 12 and 13 toward their extended position. The fluid or air on the opposite sides of the respective pistons 22, 23 is exhausted through ports 26A, 26B and 26. To effect the retraction of the movable blocks 12 and 13 and their associated fingers 28, 28 onto a workpiece, the flow of fluid, e.g. air is reversed. That is the actuating fluid is introduced into the cylinders 19 and 20 through ports 26A and 26B to force the pistons toward one another causing the block 12 and 13 to close or retract. The fluid on the opposite side of the pistons 22, 23 is exhausted through port 21. In the retracted position, it will be noted that the extended or free ends of the respective guide or support rods are received in the corresponding through-bores 12C and 13C respectively of the mounting blocks.

With the construction described, the means, i.e. piston rods effecting the drive of the mounting blocks is separate and independent from the means providing the support for the mounting blocks.

While the preferred embodiment of the present invention has been described, it will be understood that various modifications may be made without departing from the spirit and scope of the invention.

What is claimed is:

1. A parallel gripper assembly comprising:

a main housing;

a drive means including a pair of cylinder chambers oppositely disposed within said housing;

a piston reciprocally disposed within each of said chambers;

a piston rod connected to each of said pistons, and said piston rod extending outwardly of said chamber;

a mounting block fixedly connected to each of said piston rods;

said mounting blocks being disposed on opposite sides of said housing;

two pairs of laterally spaced apart complementary guide support rods slidably mounted in said housing;

each of said mounting blocks being connected to one of said pairs of complementary guide support rods for guiding the attached mounting blocks in parallel movement relative to each other;

said pair of cylinder chambers being disposed between said two pairs of complementary guide support rods;

and means for synchronizing the parallel movement of said mounting blocks independently of said drive means when said pistons are actuated;

said synchronizing means including a pinion rack on one of each of said pair of guide support rods, and a pinion gear disposed in meshing relationship with said pinion rack on said one of each said pair of support rods.

2. A parallel gripper assembly comprising:

a main housing;

a drive means including a pair of oppositely disposed cylinder chambers formed in said main housing, said cylinder chambers being disposed in axial alignment;

a piston reciprocally mounted in each of said cylinder chambers;

a piston rod connected to each of said pistons, said piston rods having their respective ends thereof extending through an end wall of its corresponding cylinder chamber;

a mounting block connected to the extended end of each of said piston rods for movement between a retracted and protracted position;

a pair of corresponding guide rods connected to each of said mounting blocks for slidably supporting said associated mounting block relative to said main housing;

said pair of corresponding guide rods connected to each of said mounting blocks being disposed on opposite sides of said drive means;

said main housing having opposed pairs of bores extending therethrough for slidably receiving said respective pairs of corresponding guide rods;

each of said corresponding guide rods having a length greater than their respective bores;

each of said mounting blocks having a pair of through-bores disposed in alignment with and arranged to receive the guide rods of said other mounting block in the retracted position thereof;

at least one of said pair of corresponding guide rods connected to each of said mounting blocks having a pinion rack extending along a length thereof;

said pinion racks on each of said one of said pair of corresponding guide rods being oppositely disposed;

a pinion gear rotatably disposed and in meshing relationship with said pinion racks to effect synchronized parallel movement of said mounting blocks when said pistons are actuated;

said pinion gear being independent of said drive means;

means for introducing an actuating fluid to either side of the respective pistons to effect the actuation of said pistons;

and a gripping finger connected to each of said mounting blocks for gripping a workpiece therebetween.

3. A parallel griper assembly comprising:

a main housing, opposed mounting blocks adapted to be displaced relative to one another between a retracted and protracted position, a respective pair of parallel guide rods connected to each of said opposed mounting blocks, said respective pairs of parallel rods being laterally and oppositely disposed to one another and slidably mounted to opposite sides of said main housing for relative movement with respect thereto for displacing said opposed mounting blocks between a retracted and protracted position, a drive means for actuating each of said opposed mounting blocks for parallel movement between said retractive and protractive positions, said drive means including a pair of cylinder means co-axially disposed internally within said housing and between said respective pairs of laterally disposed guide rods, a piston reciprocally mounted in each of said cylinder means, a piston rod connecting each of said pistons to a corresponding mounting block for effecting displacement of said corresponding mounting block when said pistons are actuated, and synchronizing means independent of said drive means for synchronizing the parallel movement of said mounting blocks when said respective pistons are actuated.

4. A parallel gripper assembly as defined in claim 3 wherein said guide rods have a length which is greater than the length of said housing;

and each of said mounting blocks being provided with through bores disposed in alignment with the guide rods connected to the other mounting block;

said through bores being aligned to receive the ends of said guide rods connected to said other mounting block in the retracted portion of said mounting blocks.

5. A parallel gripper assembly as defined in claim 3, wherein said synchronizing means comprises:

a pinion rack formed along the length of one of each of said pair of corresponding guide rods connected to each of said mounting blocks whereby said pinion rack of each said one of said guide rods being oppositely disposed;

and a pinion gear disposed between said pinion racks in meshing relationship therewith.

6. A parallel gripper assembly as defined in claim 3 wherein said guide rods are round in cross section.

7. A parallel gripper assembly as defined in claim 3 wherein said pair of corresponding guide rods are directly connected to their respective mounting blocks.

* * * * *